US012360769B2

(12) United States Patent
Cho et al.

(10) Patent No.: US 12,360,769 B2
(45) Date of Patent: Jul. 15, 2025

(54) BRANCH TARGET BUFFER OPERATION WITH AUXILIARY INDIRECT CACHE

(71) Applicant: Akeana, Inc., San Jose, CA (US)

(72) Inventors: James Youngsae Cho, Los Gatos, CA (US); Chandramouli Banerjee, Fremont, CA (US); Rabin Sugumar, Sunnyvale, CA (US)

(73) Assignee: Akeana, Inc., Santa Clara, CA (US)

( * ) Notice: Subject to any disclaimer, the term of this patent is extended or adjusted under 35 U.S.C. 154(b) by 57 days.

(21) Appl. No.: 18/534,786

(22) Filed: Dec. 11, 2023

(65) Prior Publication Data

US 2024/0192958 A1 Jun. 13, 2024

Related U.S. Application Data

(60) Provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional application No. 63/526,009, filed on Jul. 11, 2023, provisional application No. 63/521,365, filed on Jun. 16, 2023, provisional application No. 63/471,283, filed on Jun. 6, 2023, provisional application No. 63/467,335, filed on May 18, 2023, provisional ap
(Continued)

(51) Int. Cl.
*G06F 9/38* (2018.01)
*G06F 12/0875* (2016.01)

(52) U.S. Cl.
CPC ........ *G06F 9/3806* (2013.01); *G06F 12/0875* (2013.01); *G06F 2212/452* (2013.01)

(58) Field of Classification Search
None
See application file for complete search history.

(56) References Cited

U.S. PATENT DOCUMENTS 6,934,809 B2    8/2005    Tremblay et al.
7,506,105 B2    3/2009    Al-Sukhni et al.
(Continued)

FOREIGN PATENT DOCUMENTS

WO      2022117687 A1    6/2022

*Primary Examiner* — Scott C Sun
(74) *Attorney, Agent, or Firm* — Adams Intellex, PLC (57) ABSTRACT

Disclosed embodiments provide techniques for branch prediction. A processor core is accessed. The processor core is coupled to memory and includes branch prediction circuitry. The branch prediction circuitry includes a branch target buffer (BTB) and an indirect branch target buffer (BTBI). A hashed program counter within the processor core is read. The BTB and BTBI are searched. The searching the BTB is accomplished with the hashed program counter and the searching the BTBI is accomplished with the hashed program counter and branch history information. A predicted branch target address within the BTBI or the BTB is matched. The matching within the BTBI is based on an indirect branch instruction, and the matching within the BTB is based on other branch instruction types. The predicted branch target address that was matched is predicted taken. The processor core is directed to fetch a next instruction from the predicted branch target address.

26 Claims, 7 Drawing Sheets

Related U.S. Application Data plication No. 63/463,371, filed on May 2, 2023, provisional application No. 63/462,542, filed on Apr. 28, 2023, provisional application No. 63/444,619, filed on Feb. 10, 2023, provisional application No. 63/439,761, filed on Jan. 18, 2023, provisional application No. 63/436,133, filed on Dec. 30, 2022, provisional application No. 63/436,144, filed on Dec. 30, 2022, provisional application No. 63/435,831, filed on Dec. 29, 2022, provisional application No. 63/435,343, filed on Dec. 27, 2022, provisional application No. 63/434,104, filed on Dec. 21, 2022, provisional application No. 63/431,756, filed on Dec. 12, 2022.

(56) References Cited

U.S. PATENT DOCUMENTS

| | | |
|---|---|---|
| 10,013,356 B2 | 7/2018 | Chou |
| 10,671,394 B2 | 6/2020 | Britto et al. |
| 10,929,948 B2 | 2/2021 | Benthin et al. |
| 11,288,405 B2 | 3/2022 | Belgarric et al. |
| 11,403,099 B2 | 8/2022 | Cerny et al. |
| 11,403,225 B2 | 8/2022 | Zheng et al. |
| 11,429,529 B2 | 8/2022 | Hornung et al. |
| 11,442,863 B2 | 9/2022 | Shulyak et al. |
| 11,474,130 B2 | 10/2022 | Lentz et al. |
| 11,486,911 B2* | 11/2022 | Tuncer et al. |
| 2014/0195789 A1* | 7/2014 | Gupta ............ G06F 9/3806 712/239 |
| 2022/0004639 A1 | 1/2022 | Yardi et al. |
| 2022/0029780 A1 | 1/2022 | Dafali |
| 2022/0197657 A1 | 6/2022 | Soundararajan et al. |

\* cited by examiner

BRANCH TARGET BUFFER OPERATION WITH AUXILIARY INDIRECT CACHE

RELATED APPLICATIONS

This application claims the benefit of U.S. provisional patent applications "Branch Target Buffer Operation With Auxiliary Indirect Cache" Ser. No. 63/431,756 filed Dec. 12, 2022, "Processor Performance Profiling Using Agents" Ser. No. 63/434,104, filed Dec. 21, 2022, "Prefetching With Saturation Control" Ser. No. 63/435,343, filed Dec. 27, 2022, "Prioritized Unified TLB Lookup With Variable Page Sizes" Ser. No. 63/435,831, filed Dec. 29, 2022, "Return Address Stack With Branch Mispredict Recovery" Ser. No. 63/436,133, filed Dec. 30, 2022, "Coherency Management Using Distributed Snoop" Ser. No. 63/436,144, filed Dec. 30, 2022, "Cache Management Using Shared Cache Line Storage" Ser. No. 63/439,761, filed Jan. 18, 2023, "Access Request Dynamic Multilevel Arbitration" Ser. No. 63/444,619, filed Feb. 10, 2023, "Processor Pipeline For Data Transfer Operations" Ser. No. 63/462,542, filed Apr. 28, 2023, "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, and "Cache Snoop Replay Management" Ser. No. 63/605,620, filed Dec. 4, 2023.

Each of the foregoing applications is hereby incorporated by reference in its entirety.

FIELD OF ART

This application relates generally to processor instruction execution and more particularly to branch target buffer operation with an auxiliary indirect cache.

BACKGROUND

Computer processors such as microprocessors are used in many devices, ranging from powerful computers in datacenters and enterprise applications to consumer electronic devices such as laptop computers, tablet computers, smartphones, kitchen appliances, and so on. In particular, there are a growing number of low-cost, and low-power applications arising in technology areas such as the Internet-of-Things (IoT), instrumentation, remote monitoring, and so on. Processors can vary widely in terms of architecture and features. However, common to most processors is a central processing unit (CPU), one or more registers, and one or more levels of cache memory. Processors utilize registers in order to execute instructions, manipulate data, and perform other operations.

The two main categories of processors include Complex Instruction Set Computer (CISC) types and Reduced Instruction Set Computer (RISC) types. In a CISC processor, one instruction may execute several operations. The operations can include memory storage, loading from memory, an arithmetic operation, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle, and thus, the pipelined operation can allow RISC processors to operate on more than one instruction per clock cycle.

Integrated circuits (ICs) such as processors may be designed using a Hardware Description Language (HDL). Examples of such languages can include Verilog, VHDL, etc. HDLs enable the description of behavioral, register transfer, gate, and switch level logic. This provides designers with the ability to define levels in detail. Behavioral level logic allows for a set of instructions executed sequentially, while register transfer level logic allows for the transfer of data between registers, driven by an explicit clock and gate level logic. The HDL can be used to create text models that describe or express logic circuits. The models can be processed by a synthesis program, followed by a simulation program, to test the logic design. Part of the process may include Register Level Transfer (RTL) abstractions that define the synthesizable data that is fed into a logic synthesis tool, which in turn creates the gate-level abstraction of the design that is used for downstream implementation operations.

Once a design is finalized, it can be fabricated. Modern semiconductor fabrication techniques, such as 7-nanometer processes, have enabled an increasingly larger number of transistors to be formed into an integrated circuit (IC) chip. Processors with multiple billions of transistors are now in use. The smaller scale of the new transistors enables more power efficiency while also achieving increased density, paving the way for new applications for processor-enabled devices. These applications can include automotive applications, communication equipment, televisions, gaming consoles, sensors and monitoring equipment, and more. The increased capability of new generations of processors has repeatedly enabled new devices with new features, improving the user experience with those devices.

SUMMARY

Disclosed embodiments provide processor-implemented techniques for branch prediction comprising accessing a processor core that is coupled to memory. The processor core includes branch prediction circuitry that includes both a branch target buffer (BTB) and an indirect branch target buffer (BTBI). A hashed program counter is read within the processor core. The BTB is searched using the hashed program counter, and searching the BTBI is accomplished with the hashed program counter and branch history information. A predicted branch target address is matched within the BTBI or the BTB, where the matching within the BTBI is based on an indirect branch instruction, and where the matching within the BTB is based on other branch instruction types. The predicted branch target address that was matched is predicted as a taken branch, and the processor core is directed to fetch a next instruction from the predicted branch target address.

Disclosed embodiments provide techniques for branch prediction. A processor core is accessed. The processor core is coupled to memory and includes branch prediction circuitry. The branch prediction circuitry includes a branch target buffer (BTB) and an indirect branch target buffer (BTBI). A hashed program counter within the processor core is read. The BTB and BTBI are searched. The searching the BTB is accomplished with the hashed program counter and the searching the BTBI is accomplished with the hashed program counter and branch history information. A predicted branch target address within the BTBI or the BTB is matched. The matching within the BTBI is based on an indirect branch instruction, and the matching within the BTB is based on other branch instruction types. The predicted branch target address that was matched is predicted taken. The processor core is directed to fetch a next instruction from the predicted branch target address.

A processor-implemented method for branch prediction is disclosed comprising: accessing a processor core, wherein the processor core is coupled to memory, and wherein the processor core includes branch prediction circuitry, wherein the branch prediction circuitry includes a branch target buffer (BTB) and an indirect branch target buffer (BTBI); reading a hashed program counter within the processor core; searching the BTB and the BTBI, wherein the searching the BTB is accomplished with the hashed program counter and the searching the BTBI is accomplished with the hashed program counter and branch history information; matching a predicted branch target address within the BTBI or the BTB, wherein the matching within the BTBI is based on an indirect branch instruction, and wherein the matching within the BTB is based on other branch instruction types; deciding that the predicted branch target address that was matched is predicted taken; and directing the processor core to fetch a next instruction from the predicted branch target address.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Modern processors can execute many instructions per second, with some processors executing on the order of 100 GIPS (100 billion instructions per second). Programs and applications executing on these processors are used in a wide variety of applications, including enterprise solutions, personal computing, mobile communications, and more. In some cases, applications can have millions of lines of high-level source code, which compile to create object code containing even more assembly instructions. The assembly instructions implement various code elements which include loops and if statements. Loops are a programming element that repeat a portion of code some number of times until the desired process is complete. Repetitive tasks are common in programming, and loops are essential to save time and minimize errors. In some cases, loops may be executed a set number of times. In other cases, a loop may execute until some condition evaluates true or false. The condition could be based on the output of other processes or applications, or an external stimulus (e.g., an interrupt, a change in state of a GPIO (General Purpose Input Output) pin, etc.). In some cases, a conditional statement such as an if or case statement can invoke a break statement, causing an exit from the loop.

At the assembly level, loops and if statements are implemented using branch instructions. To be efficient with branching, it is helpful to use branch prediction to assess if a branch is likely to be taken. If predicted correctly, branch prediction can minimize penalties incurred by flushing an execution pipeline in a RISC processor. Pipelines can have multiple stages, including, but not limited to, instruction fetch, instruction decode, execute, memory access, and register writing. The instruction fetch stage can include reading instructions from the address in the memory whose value is present in the program counter. The instruction decode stage can include decoding the instruction and/or accessing the register file to obtain values from the registers used in the instruction. In the execute stage, ALU (arithmetic logic unit) operations are performed. In the memory access stage, memory operands are read and written from/to the memory that is present in the instruction. Finally, in the register writing stage, a computed or fetched value is written back to registers corresponding to (or specified by) the decoded instruction. Some embodiments may include processors with more, fewer, and/or different pipeline stages than those stated here.

A branch is an instruction that enables a processor to change the sequence of instructions executed. Branches allow a processor to bypass one sequence of instructions and execute a different sequence of instructions. The branch instruction results in the program counter (PC) being loaded with the address of the instruction that is going to be executed. There are a variety of techniques that can be used to specify the address of that instruction. The target address can be an absolute address or can be specified as an offset from a current location. The offset can be a signed or unsigned offset.

Branching instructions can be either conditional or unconditional. An unconditional branch is one that unconditionally loads the PC with an address. These types of instructions can be used to implement returns from functions, GOTO statements, and so on. A conditional branching instruction branches based on a condition being true or false. The conditions can include two values being equal, one value being less than another value, one value being greater than or equal to another value, and so on. Branching instructions are essential for loop structures, such as "for loops", "while loops", "do while" loops, and the like. Compilers can generate assembly language object code based on higher level languages such as C, C++, and the like. In addition to loop structures, other types of conditional coding statements can result in branching at the machine execution level. These statements can include if statements, if-else constructs, and switch statements. While not all high-level languages support each construct directly, most high-level languages can implement any conditional logic through a combination of supported high-level constructs.

The conditional statements are vital in the field of programming and software engineering, enabling a processor to receive input, such as through interrupts, I/O pins, user input, or the like, and to perform some actions based on the received input. The conditional statements are implemented using branch instructions. Thus, the performance of branch processing can have a profound impact on overall processor performance. This is especially the case in the pipelined architecture that is prevalent in RISC processors. Pipelining is a powerful logic design method that can be implemented to reduce the clock time and improve the throughput of a processor core. While pipelined processors can improve overall performance, the pipeline can introduce additional complexity and logic. In a pipelined processor, such as a RISC processor, multiple instructions are overlapped in execution. A branch in a sequence of instructions can cause a disruption in instruction execution since instructions are fetched at every clock cycle to sustain the pipeline. However, until the branch is resolved, it is not known where to fetch the next instruction from, and this causes a delay in determining the proper instruction to fetch. This scenario is often referred to as a control hazard, and it can cause a stall in the pipeline, resulting in reduced performance.

Branch processing techniques can be used to mitigate control hazards. The branch processing can include branch prediction. Branch prediction involves speculating on whether or not a branch will be taken. Static branch prediction techniques can be implemented in a compiler. The prediction can be based on typical behaviors, such as that backward branches are taken and forward branches are not taken for loop constructs. While this static branch prediction can be better than no prediction at all, it does have shortcomings in that it does not use any information on the real-time behavior of executing code.

Dynamic branch prediction can utilize a branch history table (BHT) to store values to indicate whether the branch is predicted to be taken or not taken. The lower bits of the PC address index can index a table of values to obtain the prediction. The prediction value is indicative of whether the branch was recently taken or not. Based on this, the processor fetches the next instruction from the target address if the branch is predicted to be taken. Conversely, if the branch is predicted to be not taken, the processor fetches the instruction from the next sequential address. If the prediction turns out to be incorrect, the pipeline may be flushed, and the prediction value can be updated. By using dynamic branch prediction, run-time characteristics of executed code are considered when predicting branches, which can result in improved processor performance.

Another aspect of branch processing is target address calculation. This relates to where the next instruction is, in the event that a branch is taken. The target instruction address (address of the next instruction if the branch is taken) can be based on an offset from the current program counter. The offset may have a bit length that is a subset of the instruction length. As an example, with a 32-bit instruction, a signed offset of 12 bits can enable jumping to an address up to 2048 bytes (2 KB) ahead or behind the current PC value. Sometimes it is desirable to jump to a location outside of an offset range, in which case an indirect branch instruction can be used to reference a complete target address, effectively enabling a jump to anywhere within valid memory space. Disclosed embodiments provide circuitry that includes a branch target buffer (BTB) and an indirect branch target buffer (BTBI) in order to enable this functionality.

When a branch instruction is encountered, predicting if the branch is taken, and determining the value of the next instruction, are important factors for enhancing processor performance. Target addresses can be relative to the program counter (PC), or can be absolute addresses. Relative target addresses are typically limited to some "distance" from the current PC, +/−4 KB, for example. In contrast, absolute addresses can represent most any location in memory space. An indirect branch target buffer (BTBI) can be used to implement absolute addressing, while a branch target buffer (BTB) can be used for direct mapping. In embodiments, the BTB is read during an instruction fetch cycle.

The BTB is a cache that stores the target address of a taken branch. A portion of the branch target address (e.g., 12 bits), instead of saving an entire PC (e.g., 32 bits), is saved because the majority of branches executed are PC-relative, in which case the branch target address is obtained by adding this portion to the PC. Indirect branches, however, are not PC-relative. Instead, the target address can be stored within the Integer Register File, utilizing the entire range of address bits. Alternatively, an immediate value provided as part of the instruction can be added to the contents of a register to determine the address (displacement addressing). With disclosed embodiments, the BTB size can be constrained, enabled by the presence of the BTBI, which handles indirect branching. The BTB has an indirect flag that enables the BTBI access in these cases. Thus, disclosed embodiments can provide considerable size and power savings, while still providing the support of indirect branching.

Disclosed embodiments provide processor-implemented techniques for branch prediction and comprise accessing a processor core that is coupled to memory. The processor core includes branch prediction circuitry that includes both a branch target buffer (BTB) and an indirect branch target buffer (BTBI). A hashed program counter within the processor core is read. The BTB is searched using the hashed program counter, and searching the BTBI is accomplished with the hashed program counter and branch history information. A predicted branch target address is matched within the BTBI or the BTB, where the matching within the BTBI is based on an indirect branch instruction, and where the matching within the BTB is based on other branch instruction types. The predicted branch target address that was matched is predicted as a taken branch, and the processor core is directed to fetch a next instruction from the predicted branch target address, thereby saving considerable processing cycles by preventing occurrences of pipeline flushing.

Figure 1:
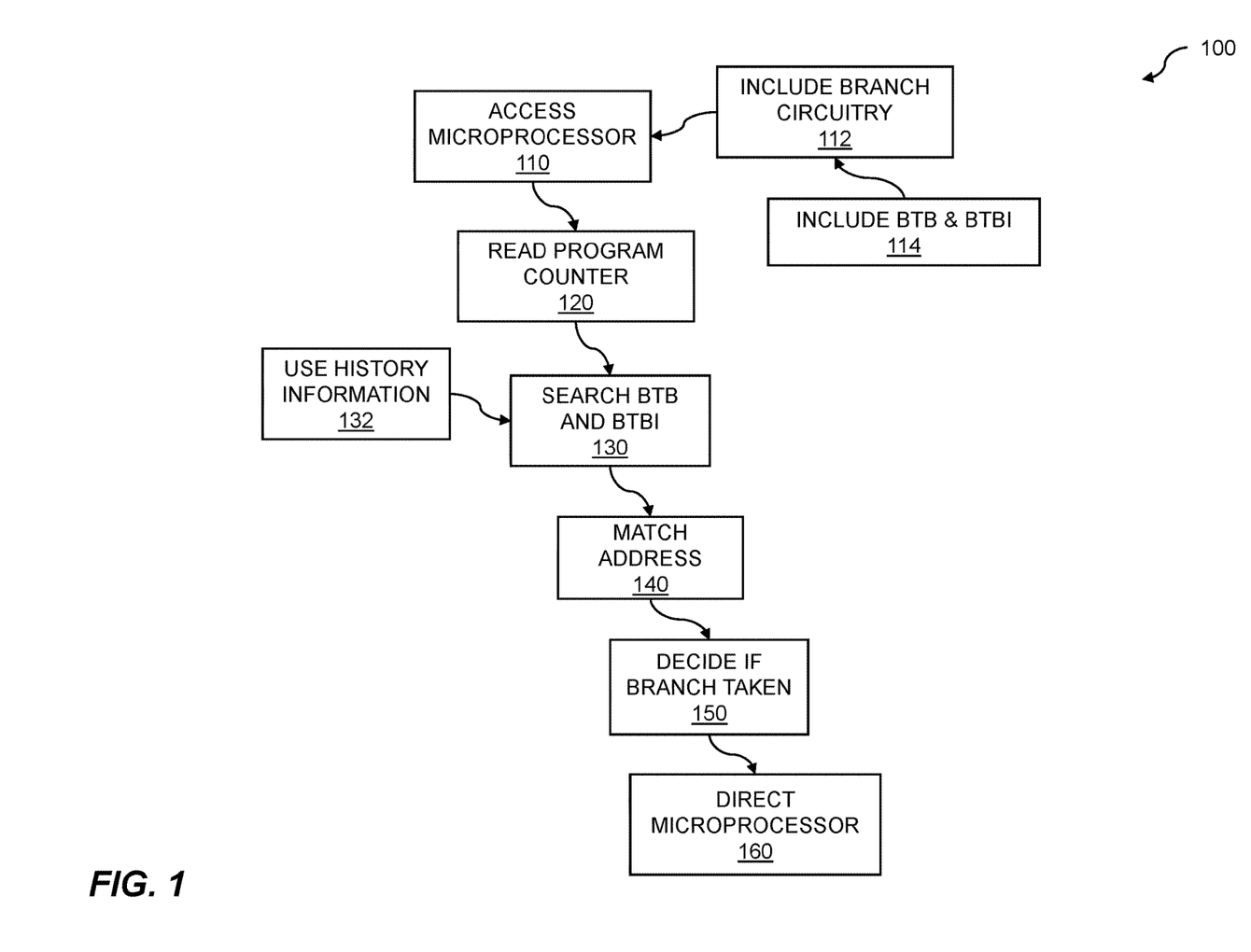
FIG. 1 is a flow diagram for branch buffer operation with an auxiliary cache.

FIG. 1 is a flow diagram 100 for branch buffer operation with an auxiliary cache. The flow includes accessing a microprocessor 110. The microprocessor can be a RISC processor. The RISC processor can include a RISC-V processor, an ARM processor, a MIPS processor, or some other suitable RISC processor type. The flow can include branch circuitry 112 usage. The branch circuitry can include BTB and BTBI 114. In embodiments, the BTBI can serve as an auxiliary cache. The flow can include reading a program counter 120. The program counter (PC) is a register in the computer processor which has the address of the next instruction to be executed. The flow continues with searching the BTB and/or BTBI 130 for a record that includes all, or a portion, of the address read from the PC. The searching can be accomplished using a hashed value of the PC address. In embodiments, the hash can be computed utilizing CRC-32, MD5, Jenkins, MurmurHash, or another suitable technique. The search can include using history information 132. The history information can include previously executed addresses, portions of previously executed addresses, branch outcomes of previous branch instructions, and so on.

The flow continues with matching an address 140. The matching can include identifying a target address based on a successful search using the hashed PC contents. The target address represents the next instruction address, in the event that a branch is taken. The flow continues, where a decision on if the branch is taken 150 is made. The branch can be taken (T), or not taken (NT). The decision can be based on a branch history table (BHT). The BHT can comprise one or more bits that indicate previous evaluations of a previously executed branch. The BHT can be implemented as a table with multiple entries per table, where each entry corresponds to a particular branch instruction. In embodiments, the BHT may include one or more bits per table entry. The prediction can include predicting the same outcome as the previous result. That is, if a given branch was not taken on the previous execution, then it is assumed that the branch is not taken on the next execution. Similarly, if a given branch was taken on the previous execution, then it is assumed that the branch will be taken on the next execution. The flow continues, where the microprocessor is directed 160 according to the previously described branch prediction 150. In the event the branch is predicted to be taken, the target address from the BTB or BTBI is used as the next instruction address. If the branch is predicted NT, then the subsequent instruction (PC+X) is used as the next instruction address, where X is a value based on instruction length. For a 32-bit instruction, X can be 4 bytes. For a 16-bit instruction, X can be two bytes, and so on.

Figure 2:
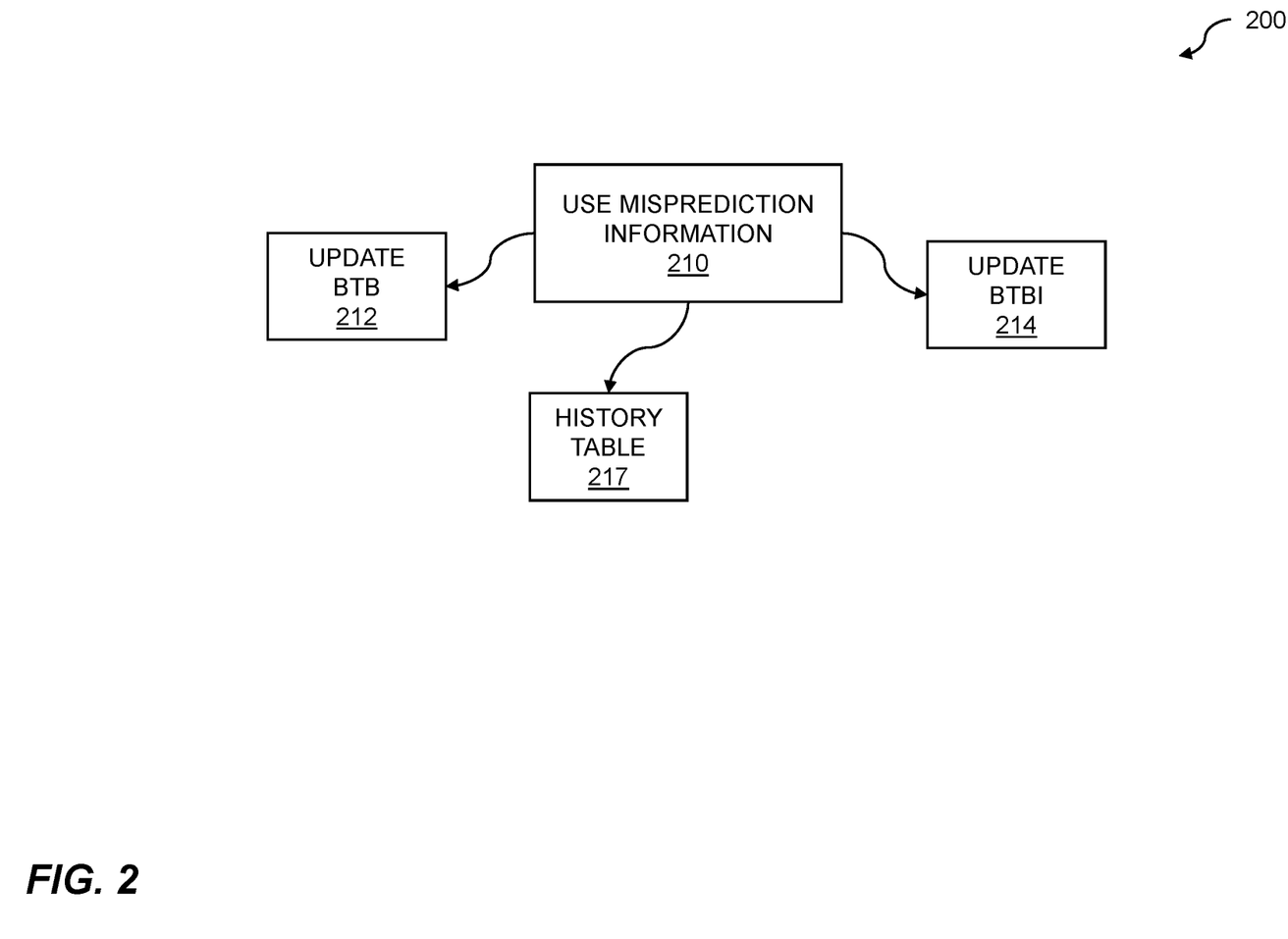
FIG. 2 is a flow diagram for updating branch prediction.

FIG. 2 is a flow diagram 200 for updating branch prediction. Branch prediction can help optimize processor performance. However, there are times when the prediction is incorrect. As an example, a program can implement a code loop in which, at the end of the loop, a condition is checked to determine if the processor should execute the code loop again, or instead, exit the loop. If the loop executes the code loop multiple times in sequence, the prediction is likely to be that the branch will be taken. If the condition evaluates in the opposite value, such that the loop exits, the branch prediction may predict incorrectly, based on previous execution history. The flow includes using misprediction information 210. When an incorrect prediction is encountered, subsequent action can include updating the BTB 212 and/or updating the BTBI 214. The updating can include updating prediction bits and/or target addresses. The updating can also include updating a history table 217. In embodiments, the history table 217 can include multiple entries, where each entry corresponds to a branch instruction, and one or more bits within each entry record the outcome (NT or T) of the previous E number of executions. In embodiments, the value of E is one or two. If E=1, then there is a 1-bit history field for each entry. If E=2, then there is a 2-bit history field for each entry. A 2-bit predictor can provide some advantages regarding branch prediction. In these embodiments, two bits are maintained in the prediction buffer and there are four different states. Two states correspond to a taken state and two correspond to a not taken state. An advantage of embodiments utilizing a 2-bit predictor includes that an occasional mispredicted branch outcome is less likely to adversely affect future predictions, as the status only changes when there are two consecutive mispredictions. In some embodiments, the value of E can be greater than 2.

In pipelined processors such as RISC processors, a missed branch prediction (mispredict) can involve a penalty consisting of numerous clock cycles used to recover the speculative execution on the wrong control flow path. The penalty is a function of the number of pipeline stages between the issued pipeline stage and the execution pipeline stage generating the branch condition. Disclosed embodiments can reduce the occurrences of mispredicts (mispredictions), thereby improving processor performance. Embodiments can include updating the BTB with branch mispredict information. In some embodiments, the BTB is updated for a taken misprediction of all branch instructions, wherein a branch target address within the BTB is updated only for direct branch instructions. Embodiments can include updating the BTBI with indirect branch mispredict information. In embodiments, the BTBI is updated for a taken misprediction of an indirect branch instruction.

Figure 3:
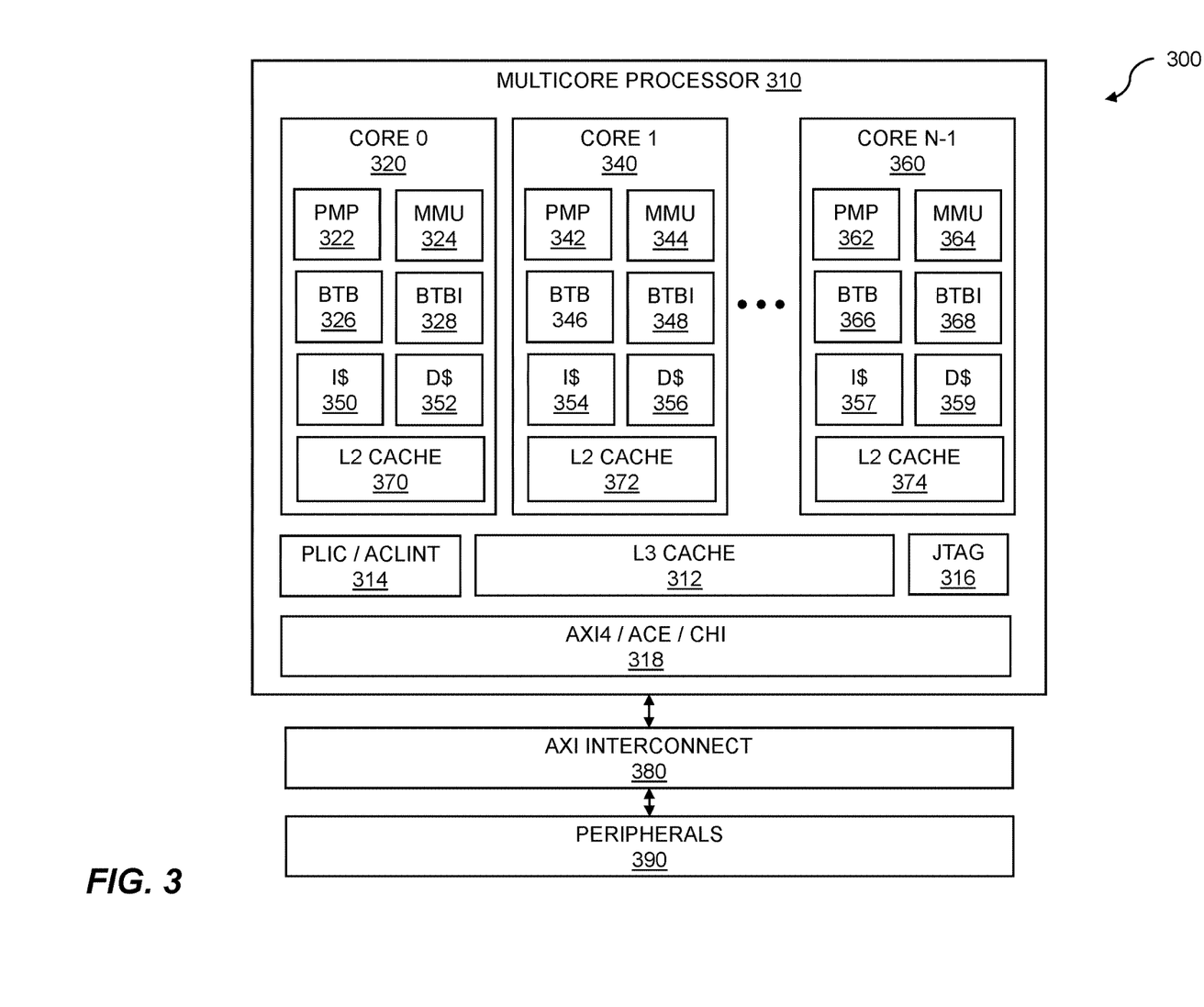
FIG. 3 is a block diagram illustrating a RISC-V processor.

FIG. 3 is a block diagram 300 illustrating a RISC-V™ processor. The processor can include a multi-core processor, where two or more processor cores can be included. The processor, such as a RISC-V™ processor, can include a variety of elements. The elements can include processor cores, one or more caches, memory protection and management units, local storage, and so on. The elements of the multicore processor can further include one or more of a private cache, a test interface such as a joint test action group (JTAG) test interface, one or more interfaces to a network such as a network-on-chip, shared memory, peripherals, and the like.

The block diagram 300 can include a multicore processor 310. The multicore processor can comprise two or more processors, where the two or more processors can include homogeneous processors, heterogeneous processors, etc. In the block diagram, the multicore processor can include N processor cores such as core 0 320, core 1 340, core N−1 360, and so on. Each processor can comprise one or more elements. In embodiments, each core, including cores 0 through core N−1 can include a physical memory protection (PMP) element, such as PMP 322 for core 0; PMP 342 for core 1, and PMP 362 for core N−1. In a processor architecture such as the RISC-V™ architecture, PMP elements can enable processor firmware to specify one or more regions of physical memory such as cache memory of the shared memory, and to control permissions to access the regions of physical memory. The cores can include a memory management unit (MMU) such as MMU 324 for core 0, MMU 344 for core 1, and MMU 364 for core N−1. The memory management units can translate virtual addresses used by software running on the cores to physical memory addresses with caches, the shared memory system, etc.

In embodiments, each core, including cores 0 through core N−1 can include a branch target buffer (BTB), such as BTB 326 for core 0; BTB 346 for core 1; and BTB 366 for core N−1. The BTB can be implemented as a cache, accessed by a hashed PC value. In some embodiments, the BTB comprises an n-way set associative cache, wherein each way of the n-ways comprises multiple banks. In some embodiments, the number of multiple banks equals a number of instructions fetched by the processor core in a single cycle. In embodiments, each core, including cores 0 through core N−1, can include an indirect branch target buffer (BTBI), such as BTBI 328 for core 0; BTBI 348 for core 1; and BTBI 368 for core N−1. The BTBI can be implemented as a different structure than the BTB. Example BTBI implementations can include a direct-mapped implementation, a smaller associativity than the BTB, no banking, and/or dual or single ported. The combination of BTB and BTBI elements in disclosed embodiments serves to reduce the size of the BTB while still providing the absolute addressing functionality enabled by the BTBI. In embodiments, the processor core is included in a multiprocessor system. The number of multiple banks can be accessed by the fetched instruction of its address offset matches.

An n-way set associative cache is a cache that is organized in sections referred to as sets. Each set can contain n blocks. The cache address can contain various fields that include the offset within the block, the index that identifies the set, and the tag that identifies the block in the set. When a cache request arrives, the index is calculated to identify the set. Then, the tags of all of the blocks in the set are checked. When a block with a matching tag is found, the corresponding data is returned based on the offset. An advantage of an n-way set associative cache in disclosed embodiments includes the ability to support multiple blocks for a set of addresses.

The processor cores associated with the multicore processor 310 can include caches such as instruction caches and data caches. The caches, which can comprise level 1 (L1) caches, can include an amount of storage such as 16 KB, 32 KB, and so on. The caches can include an instruction cache I$ 350 and a data cache D$ 352 associated with core 0; an instruction cache I$ 354 and a data cache D$ 356 associated with core 1; and an instruction cache I$ 357 and a data cache D$ 359 associated with core N−1. In addition to the level 1 instruction and data caches, each core can include a level 2 (L2) cache. The level 2 caches can include L2 cache 370 associated with core 0; L2 cache 372 associated with core 1; and L2 cache 374 associated with core N−1. The cores associated with the multicore processor 310 can include further components or elements. The further elements can include a level 3 (L3) cache 312. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 314. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 316. The JTAG element can provide boundary within the cores of the multicore processor. The JTAG element can enable fault information to a high precision. The high-precision fault information can be critical to rapid fault detection and repair.

The multicore processor 310 can include one or more interface elements 318. The interface elements can support standard processor interfaces such as an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. In the block diagram 300, the interface elements can be coupled to the interconnect. The interconnect can include a bus, a network, and so on. The interconnect can include an AXI™ interconnect 380. In embodiments, the network can include network-on-chip functionality. The AXI™ interconnect can be used to connect memory-mapped "master" or boss devices to one or more "slave" or worker devices. In the block diagram 300, the AXI interconnect can provide connectivity between the multicore processor 310 and one or more peripherals 390. The one or more peripherals can include storage devices, networking devices, and so on. The peripherals can enable communication using the AXI™ interconnect by supporting standards such as AMBA™ version 4, among other standards.

Figure 4:
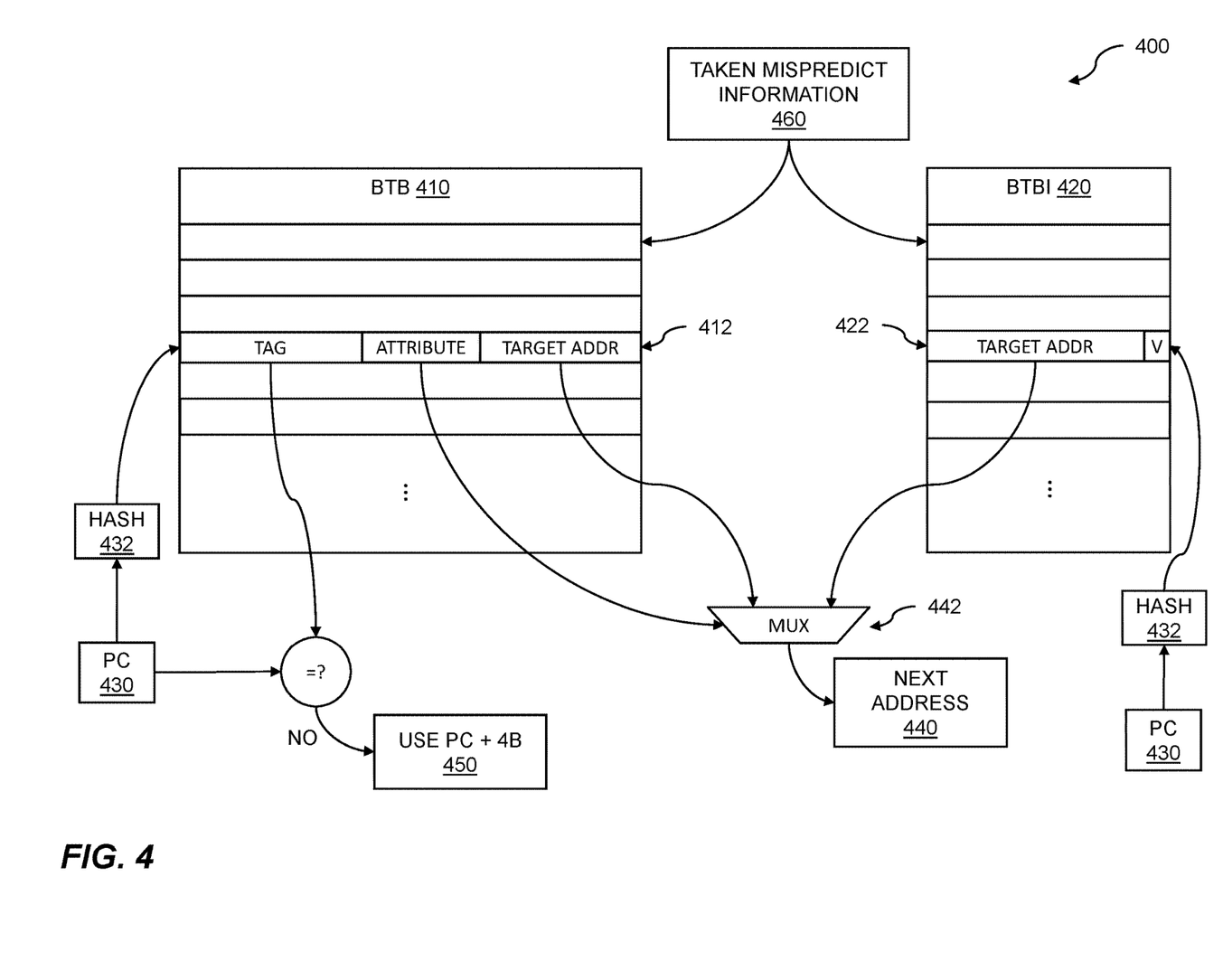
FIG. 4 illustrates BTB and BTBI structures.

FIG. 4 is a diagram 400 illustrating BTB and BTBI structures. In embodiments, the BTB comprises a tag cache and a data cache. In embodiments, the BTB stores compressed branch target addresses. In some embodiments, multiple compressed instructions are stored in a single BTB entry. In RISC processors, compressed instructions are a compact version of the instruction set of a processor that serves to improve the code density of executable programs. As an example, some RISC processors may utilize 32-bit instruction words, while the compressed instructions utilize shortened 16-bit instructions. While the compressed instructions may include some reduction in functionality, such as only accessing a subset of the registers, more use of specific registers, and/or arithmetic constraints, in many cases, the compressed instructions enable smaller executable programs that require less memory to load while still performing their intended functions. In some embodiments, instructions may be unaligned, crossing a boundary of a group of naturally aligned 4-byte addresses or even a cache line. The BTB can support unaligned instructions. In embodiments, each bank of the BTB is accessed either by fetch group "N" or a mix of fetch group "N" and fetch group "N+1". Each entry of the BTB may store a portion of a branch target address. In embodiments, the portion of the branch target address is combined with the hashed program counter to obtain the branch target address. The portion of the branch target address can be 12 bits. In embodiments, the BTBI is direct mapped and comprises 512 entries. In embodiments, the number of BTBI entries can be parameterized. Some embodiments may use more or fewer entries in the BTBI. As an example, some embodiments may use 1024 or 2048 entries in the BTBI. In embodiments, each entry of the BTBI comprises a target address of the indirect branch instruction and a valid bit, indicated by a V. In some embodiments, the valid bit within the BTBI remains valid once set.

An exemplary entry within BTB 410 is indicated at 412. Each entry includes a tag, which can include one or more bits. In some embodiments, the tag bit length can range from four bits to eight bits. Other sizes are possible. Each entry further includes an attribute field (ATTRIBUTE). The attribute field can include one or more bits indicating validity, branch instruction type, instruction size, an indirect branch flag that enables the BTBI access, and/or other information. Each entry further includes a target address (TARGET ADDR). The target address includes a portion of a branch target address, which can represent the address to be executed if a branch is taken. Taken mispredict information 460 can be used to speculate on the next target address to be used in execution. The branching can be PC-relative branching, or absolute/indirect branching. In embodiments, indirect branching instructions generate a mispredict condition in the BTB 410, such as no matching tag identified in the BTB. The indirect branching instruction may be concurrently or sequentially checked within the BTBI 420, and if found, optimized indirect branching can be achieved.

An exemplary entry within the BTBI 420 is indicated at 422. Each entry includes a target address (TARGET ADDR). Within the BTBI, the target address can include a portion of a target instruction address, or the entire address, which can represent the address to be executed if a branch is taken. Each entry further includes a valid bit (V). The valid bit V can be used to indicate the validity of a BTBI entry. In some embodiments, each entry may be marked as invalid upon initialization. As entries within the BTBI are populated, they are marked as valid. In some embodiments, once marked valid, the entries remain valid throughout the execution lifecycle. That is, in some embodiments, an error in a BTBI access does not invalidate the entry, allowing the entry to remain valid for a future access. The execution lifecycle can include the execution of a program, and/or the duration for which a processor is powered on and is executing code. In some embodiments, the execution lifecycle ends when a processor is reset, rebooted, and/or power cycled.

In embodiments, entries within the BTB 410 and/or BTBI 420 are accessed via a value within program counter 430 that is converted to a hash 432, and used to identify an entry via a matching tag. If a branch is predicted to be taken, the target address (TARGET ADDR) retrieved from the BTB or from the BTBI is used as the next address for the next PC address value 440. A multiplexor (MUX) 442 can select between these two addresses to determine the next address. In embodiments, an indirect bit in the attribute portion of the BTB entry controls selection of the MUX to provide the next address from the BTB (if the indirect bit is not set) or the BTBI (if the indirect bit is set). If a branch with an entry in the BTB is not taken, then the next address to be used is the program counter value plus four bytes, indicated at 450. Some embodiments may utilize a different offset than four bytes. For example, with a 16-bit instruction set, the offset may be two bytes. In that scenario, for a not taken branch prediction, the next address to be used may be computed as the current program counter value plus two bytes.

Figure 5:
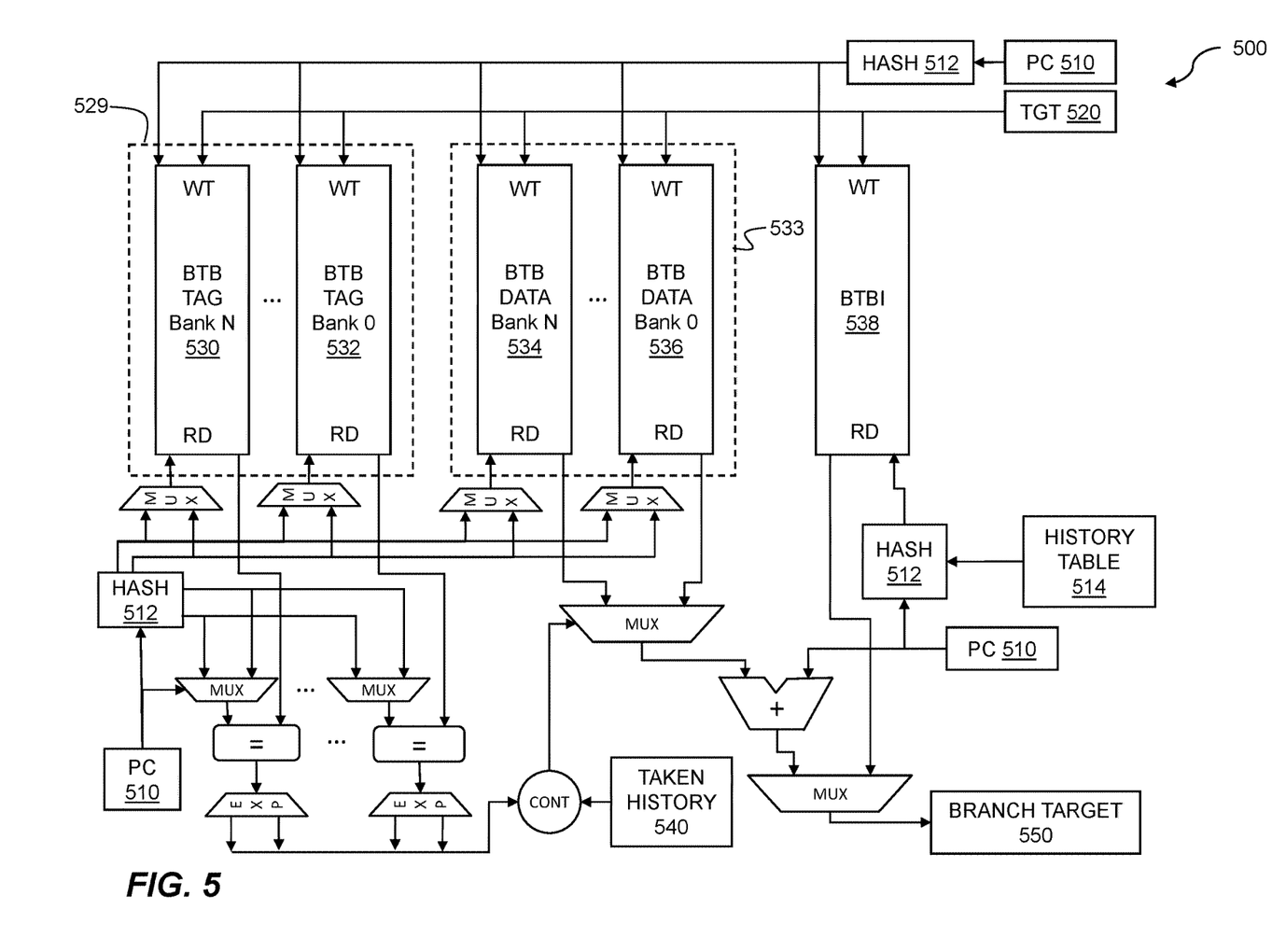
FIG. 5 is a detailed diagram for BTB and BTBI operation.

FIG. 5 is a detailed diagram 500 for BTB and BTBI operation. Embodiments can include multiple bank BTB structures that include data storage and tag storage. The BTB can be implemented as an n-way set associative cache. In embodiments, the n-way cache may be a 2-way set associative cache, a 4-way set associative cache, or some other suitable configuration. As shown in FIG. 5, there are two BTB storage structures, indicated as 529 and 533. Storage structure 529 includes multiple banks of tag storage, including bank 0 532, and bank N 530. While two banks are shown, in practice there can be more than two banks within storage structure 529. Storage structure 533 includes multiple banks of data storage, including bank 0 536, and bank N 534. While two banks are shown, in practice there can be more than two banks within storage structure 533. In embodiments, the banks 530, 532, 534, and 536 are dual ported, having an interface for writing, indicated by WT, and an interface for reading, indicated by RD.

Embodiments include a BTBI 538. The BTBI structure is separate from the BTB structure. The independence of the BTBI structure enables a reduced size of the BTB structure since the full size of indirect branch target addresses are provided by the BTBI. The BTBI may also be dual ported, as indicated by the WT and RD inputs to the BTBI 538. In embodiments, the dual ported banks may include two ports that allow fully independent reads and writes at different frequencies. The functionality of the dual ports can enable concurrent access of the memory array by utilizing parallel input-output data lines. Dual-port read operations to N and N+1 lines can allow a wrap-around mode to access a wider range of branch prediction. Read-Write, and/or Write-Write conflicts can be resolved with a priority bit that is computed in situations in which there are multiple write requests for the same memory location. In embodiments, a program counter value 510 is hashed to produce a hash value 512. The hash value 512 can be used for read or write access of the BTB and/or BTBI structures.

In embodiments, one or more multiplexors (indicated by MUX), comparators (indicated by '='), and/or expanders (indicated by 'EXP') may be used to implement digital logic used to interface with the BTB and/or BTBI. In embodiments, the expanders are used to enable a feature where a tag match is expanded to odd/even pairs to support compressed or unaligned branches. The output from the BTB and/or BTBI can include a branch target 550. The branch target 550 can include an address of an instruction to be executed in the event that a given branch is taken. The evaluation of a previous execution of a branch (taken or not taken) can be updated in a history table 514 and/or taken history 540. In some embodiments, the history table 514 and taken history 540 may be common information.

In embodiments, the hashed program counter includes information from a program counter and a global branch history table. In embodiments, the BTBI includes a cache structure that comprises a different size, associativity, or number of banks than the BTB. A target 520 can include an address of an instruction to be executed in the event a branch is taken. The target 520 can be loaded into the BTBI and/or BTB structures. When the target 520 is written to an entry in BTBI 538, it may be written in its full length (e.g., 32 bits, 64 bits, etc.). When the target 520 is written to the BTB, such as in storage structure 533, it may be written as a portion. The portion can be the N least significant bits of an address. In embodiments, the value of N can range from 8 bits to 14 bits. Other embodiments may utilize a different value of N. The portion can represent an offset used for relative addressing from a location specified by program counter (PC) 510. The offset can be signed or unsigned. By separating the BTB and BTBI into different, independent structures, relative and absolute/indirect branching can be optimized in terms of required circuitry. This allows the BTB structures to be of reduced size as compared with structures that support both relative and absolute/indirect branching, thus enabling a more efficient processor integrated circuit in terms of gate count, die size, power consumption, and/or other important metrics. As can be seen in FIG. 5, both the BTB and BTBI can be accessed by a hashed program counter value. The BTBI additionally uses information from a history table 514 that can provide different target addresses. The different target addresses can be pointed to by the same PC. This supports functionality in which the program counter can refer to a relative or absolute branch target, including one based on data in the Integer Register File (IRF) of a processor.

Figure 6:
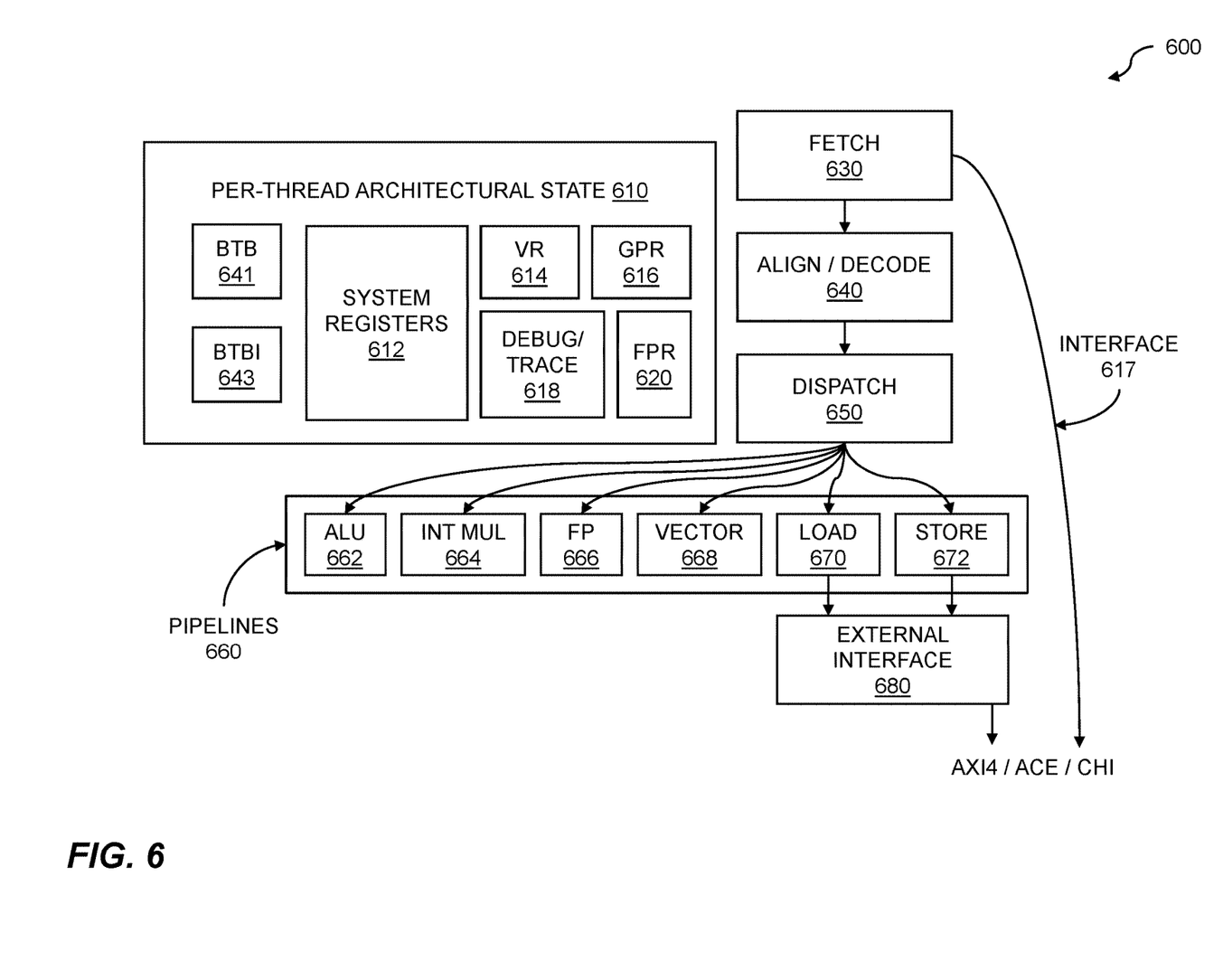
FIG. 6 is a block diagram for a pipeline.

FIG. 6 is a block diagram 600 for a pipeline. The use of one or more pipelines associated with a processor architecture can greatly enhance processing throughput. The processing throughput can be increased because multiple operations can be executed in parallel. The use of one or more pipelines supports branch target buffer operation with auxiliary indirect cache. Pipelines can have multiple stages, such as, for example, instruction fetch, instruction decode, execute, memory access, and register writing. The auxiliary indirect cache can be implemented with an indirect branch target buffer (BTBI). Disclosed embodiments serve to improve branch prediction for both relative and absolute/indirect branching modes, which can minimize penalties incurred by flushing an execution pipeline in a RISC processor.

The FIG. 600 shows a block diagram of a pipeline such as a core pipeline. The blocks within the block diagram can be configurable in order to provide varying processing levels. The varying processing levels can be based on processing speed, bit lengths, and so on. The block diagram 600 can include a fetch block 630. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 617. The interface can include a standard interface such as one or more industry standard interfaces. The interfaces can include an Advanced eXtensible Interface (AXI™), an ARM™ Advanced eXtensible Interface (AXI™) Coherence Extensions (ACE™) interface, an Advanced Microcontroller Bus Architecture (AMBA™) Coherence Hub Interface (CHI™), etc.

The block diagram 600 includes an align and decode block 640. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 600 can include a dispatch block 650. The dispatch block can receive decoded instruction packets from the align and decode block. The decode instruction packets can be used to control a pipeline 660, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 662, integer multiplier pipelines 664, floating-point unit (FPU) pipelines 666, vector unit (VU) pipelines 668, and so on. The dispatch unit can further dispatch instructions to pipelines that can include load pipelines 670 and store pipelines 672. The load pipelines and the store pipelines can access storage such as the common memory using an external interface 680. The external interface can be based on one or more interface standards such as the Advanced eXtensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, processors can be configured to support multi-threading. The system block diagram can include a per-thread architectural state block 610. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 612. The system registers can be associated with individual processors, a system comprising multiple processors, and so on. The system registers can include exception and interrupt components, counters, etc. The per-thread architectural state can include further registers such as vector registers (VR) 614, general purpose registers (GPR) 616, and floating-point registers (FPR) 620. These registers can be used for vector operations, general purpose (e.g., integer) operations, and floating-point operations, respectively. The per-thread architectural state can include a debug and trace block 618. The debug and trace block can enable debug and trace operations to support code development, troubleshooting, and so on. In embodiments, an external debugger can communicate with a processor through a debugging interface such as a joint test action group (JTAG) interface. The per-thread architectural state can include a BTB 641. The BTB can include a cache that stores the target address of taken branches. A portion of branch target address (e.g., 12 bits), instead of saving an entire PC (e.g., 32 bits), is used in embodiments to support the majority of branches, which are executed as PC-relative. The architectural state can include a BTBI 643. The BTBI can include full-length target addresses (e.g., 32-bit addresses, 64-bit addresses, etc.) to support target instructions for branching anywhere within valid memory space.

Figure 7:
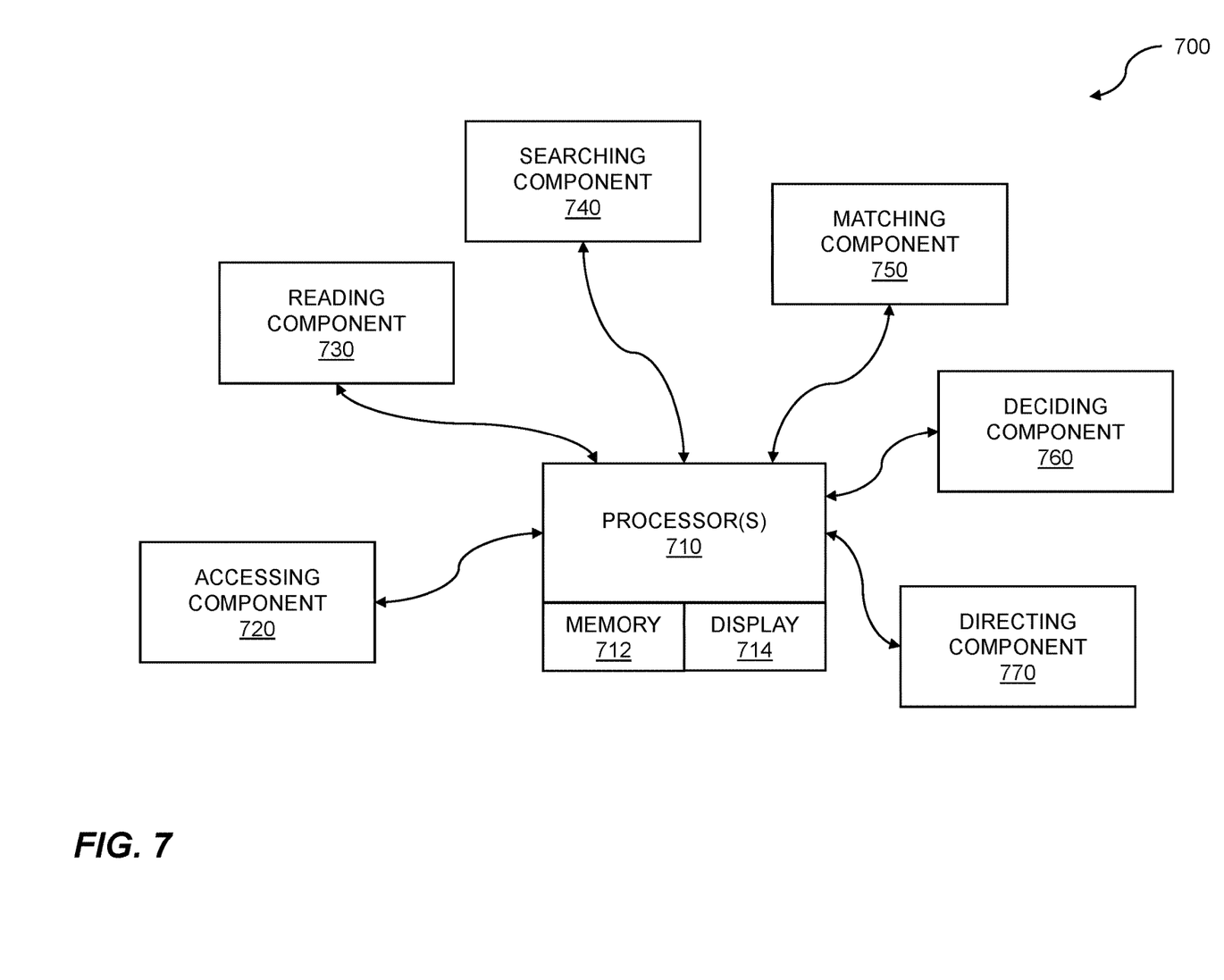
FIG. 7 is a system diagram for branch target buffer operation with an auxiliary cache.

FIG. 7 is a system diagram for branch target buffer operation with an auxiliary cache. The system 700 can include instructions and/or functions for design and implementation of integrated circuits that support branch target buffer operation. The system 700 can include instructions and/or functions for generation and/or manipulation of design data such as hardware description language (HDL) constructs for specifying structure and operation of an integrated circuit. The system 700 can further perform operations to generate and manipulate Register Level Transfer (RTL) abstractions. These abstractions can include parameterized inputs that enable specifying elements of a design such as a number of elements, sizes of various bit fields, and so on. The parameterized inputs can be input to a logic synthesis tool which in turn creates the semiconductor logic that includes the gate-level abstraction of the design that is used for fabrication of integrated circuit (IC) devices. In embodiments, the data size of a tag offset is parameterized.

The system can include one or more of processors, memories, cache memories, displays, and so on. The system 700 can include one or more processors 710. The processors can include standalone processors within integrated circuits or chips, processor cores in field programmable gate arrays (FPGAs) or application specific integrated circuits (ASICs), and so on. The one or more processors 710 are coupled to a memory 712, which stores operations. The memory can include one or more of local memory, cache memory, system memory, internal memory, external memory, etc. The system 700 can further include a display 714 coupled to the one or more processors 710. The display 714 can be used for displaying data, instructions, operations, and the like. The operations can include instructions and functions for implementation of integrated circuits, including processor cores. In embodiments, the processor cores can include RISC-V™ processor cores. In embodiments, one or more processors 710 are coupled to the memory 712, wherein the one or more processors, when executing the instructions which are stored, are configured to: access a processor core, wherein the processor core is coupled to memory, and wherein the processor core includes branch prediction circuitry, wherein the branch prediction circuitry includes a branch target buffer (BTB) and an indirect branch target buffer (BTBI); read a hashed program counter within the processor core; search the BTB and the BTBI, wherein the searching the BTB is accomplished with the hashed program counter and the searching the BTBI is accomplished with the hashed program counter and branch history information; match a predicted branch target address within the BTBI or the BTB, wherein the matching within the BTBI is based on an indirect branch instruction, and wherein the matching within the BTB is based on other branch instruction types; decide that the predicted branch target address that was matched is predicted taken; and direct the processor core to fetch a next instruction from the predicted branch target address.

The system 700 can include an accessing component 720. The accessing component 720 can include functions and instructions for processing design data for accessing one or more processor cores. The processor cores can include FPGAs, ASICs, etc. In embodiments, the processor cores can include RISC-V™ processor cores. Each processor of the plurality of processor cores can support relative and absolute/indirect branching through the use of independent BTB and BTBI structures as described previously.

The system 700 can include a reading component 730. The reading component 730 can include functions and instructions for processing design data for reading a hashed program counter within the processor core. The hashed program counter can be used for access to BTB and BTBI structures. The hashed program counter can be implemented via a variety of functions, including, but not limited to, CRC-16, CRC-32, MD5, Jenkins, MurmurHash, or some other suitable technique. The system 700 can include a searching component 740. The searching component 740 can include functions and instructions for processing design data for searching a BTB and/or BTBI, wherein the searching of the BTB is accomplished with the hashed program counter, and the searching the BTBI is accomplished with the hashed program counter and branch history information. The system 700 can include a matching component 750. The matching component 750 can include functions and instructions for processing design data for matching a predicted branch target address within the BTBI or the BTB, wherein the matching within the BTBI is based on an indirect branching instruction, and wherein the matching within the BTB is based on other branch instruction types. The system 700 can include a deciding component 760. The deciding component 760 can include functions and instructions for processing design data for deciding that the predicted branch target address that was matched is predicted taken. The deciding can include querying a branch history table (BHT), and/or branch target buffers (BTB) and/or indirect branch target buffers (BTBI). The system 700 can include a directing component 770. The directing component 770 can include functions and instructions for processing design data for directing the processor core to fetch a next instruction from the predicted branch target address. The address can be obtained from the BTB or BTBI, depending on the type of branch instruction.

The system 700 can include a computer program product embodied in a non-transitory computer readable medium for branch prediction, the computer program product comprising code which causes one or more processors to generate semiconductor logic for: accessing the processor core, wherein the processor core is coupled to the memory, and wherein the processor core includes branch prediction circuitry, wherein the branch prediction circuitry includes a branch target buffer (BTB) and an indirect branch target buffer (BTBI); reading a hashed program counter within the processor core; searching the BTB and the BTBI, wherein the searching the BTB is accomplished with the hashed program counter and the searching the BTBI is accomplished with the hashed program counter and a branch history information; matching a predicted branch target address within the BTBI or the BTB, wherein the matching within the BTBI is based on an indirect branch instruction, and wherein the matching within the BTB is based on other branch instruction types; deciding that the predicted branch target address that was matched is predicted taken; and directing the processor core to fetch a next instruction from the predicted branch target address.

The system 700 can include an apparatus for branch prediction comprising: a processor core coupled to memory, wherein the processor core and the memory are used to perform operations comprising: accessing the processor core, wherein the processor core is coupled to the memory, and wherein the processor core includes branch prediction circuitry, wherein the branch prediction circuitry includes a branch target buffer (BTB) and an indirect branch target buffer (BTBI); reading a hashed program counter within the processor core; searching the BTB and the BTBI, wherein the searching the BTB is accomplished with the hashed program counter and the searching the BTBI is accomplished with the hashed program counter and branch history information; matching a predicted branch target address within the BTBI or the BTB, wherein the matching within the BTBI is based on an indirect branch instruction, and wherein the matching within the BTB is based on other branch instruction types; deciding that the predicted branch target address that was matched is predicted taken; and directing the processor core to fetch a next instruction from the predicted branch target address.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions-generally referred to herein as a "circuit," "module," or "system" may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for branch prediction comprising:
   accessing a processor core, wherein the processor core is coupled to memory, and wherein the processor core includes branch prediction circuitry, wherein the branch prediction circuitry includes a branch target buffer (BTB) and an indirect branch target buffer (BTBI);
   reading a hashed program counter within the processor core;
   searching the BTB and the BTBI, wherein the searching the BTB is accomplished with the hashed program counter and the searching the BTBI is accomplished with the hashed program counter and branch history information;
   matching a predicted branch target address within the BTBI or the BTB, wherein the matching within the BTBI is based on an indirect branch instruction, and wherein the matching within the BTB is based on other branch instruction types;
   deciding that the predicted branch target address that was matched is predicted taken; and
   directing the processor core to fetch a next instruction from the predicted branch target address.

2. The method of claim 1 wherein the BTB comprises an n-way set associative cache, wherein each way of the n-ways comprises multiple banks.

3. The method of claim 2 wherein the number of multiple banks equals a number of instructions fetched by the processor core in a single cycle.

4. The method of claim 3 wherein each bank within the number of multiple banks can be accessed by the fetched instruction of its address offset matches.

5. The method of claim 2 wherein the BTB comprises a tag cache and a data cache.

6. The method of claim 5 wherein a data size of a tag offset is parameterized.

7. The method of claim 1 wherein the BTB stores compressed branch target addresses.

8. The method of claim 7 wherein multiple compressed instructions are stored in a single BTB entry.

9. The method of claim 8 wherein each entry of the BTB stores a portion of a branch target address.

10. The method of claim 9 wherein the portion of the branch target address is combined with the hashed program counter to obtain the branch target address.

11. The method of claim 10 wherein the hashed program counter includes information from a program counter and a global branch history table.

12. The method of claim 9 wherein the portion of the branch target address is 12 bits.

13. The method of claim 1 wherein the BTB supports unaligned instructions.

14. The method of claim 13 wherein each bank of the BTB is accessed either by a fetch group "N" or a mix of fetch group "N" and fetch group "N+1".

15. The method of claim 1 wherein the BTBI includes a cache structure that comprises a different size, associativity, or number of banks than the BTB.

16. The method of claim 15 wherein the BTBI is direct mapped.

17. The method of claim 15 wherein the BTBI comprises 512 entries.

18. The method of claim 15 wherein each entry of the BTBI comprises a target address of the indirect branch instruction and a valid bit.

19. The method of claim 18 wherein the valid bit within the BTBI remains valid once set.

20. The method of claim 1 further comprising updating the BTB with branch mispredict information.

21. The method of claim 20 wherein the BTB is updated for a taken misprediction of all branch instructions, and wherein a branch target address within the BTB is updated only for direct branch instructions.

22. The method of claim 1 further comprising updating the BTBI with indirect branch mispredict information.

23. The method of claim 22 wherein the BTBI is updated for a taken misprediction of the indirect branch instruction.

24. The method of claim 1 wherein the processor core is included in a multiprocessor system.

25. A computer program product embodied in a non-transitory computer readable medium for branch prediction, the computer program product comprising code which causes one or more processors to generate semiconductor logic for:
    accessing a processor core, wherein the processor core is coupled to memory, and wherein the processor core includes branch prediction circuitry, wherein the branch prediction circuitry includes a branch target buffer (BTB) and an indirect branch target buffer (BTBI);
    reading a hashed program counter within the processor core;
    searching the BTB and the BTBI, wherein the searching the BTB is accomplished with the hashed program counter and the searching the BTBI is accomplished with the hashed program counter and branch history information;
    matching a predicted branch target address within the BTBI or the BTB, wherein the matching within the BTBI is based on an indirect branch instruction, and wherein the matching within the BTB is based on other branch instruction types;
    deciding that the predicted branch target address that was matched is predicted taken; and
    directing the processor core to fetch a next instruction from the predicted branch target address.

26. An apparatus for branch prediction comprising:
    a processor core coupled to memory, wherein the processor core and the memory are used to perform operations comprising:
        accessing the processor core, wherein the processor core is coupled to the memory, and wherein the processor core includes branch prediction circuitry, wherein the branch prediction circuitry includes a branch target buffer (BTB) and an indirect branch target buffer (BTBI);
        reading a hashed program counter within the processor core;
        searching the BTB and the BTBI, wherein the searching the BTB is accomplished with the hashed program counter and the searching the BTBI is accomplished with the hashed program counter and branch history information;
        matching a predicted branch target address within the BTBI or the BTB, wherein the matching within the BTBI is based on an indirect branch instruction, and wherein the matching within the BTB is based on other branch instruction types;
        deciding that the predicted branch target address that was matched is predicted taken; and
        directing the processor core to fetch a next instruction from the predicted branch target address.

* * * * *